(12) United States Patent
Schmidt-Böcking et al.

(10) Patent No.: US 9,617,970 B2
(45) Date of Patent: Apr. 11, 2017

(54) PUMPED-STORAGE POWER PLANT

(75) Inventors: Horst Schmidt-Böcking, Kelkheim-Ruppertshain (DE); Gerhard Luther, Saarbrücken (DE)

(73) Assignee: ROENTDEK-HANDELS GMBH, Kelkheim-Ruppertshain (DE)

( * ) Notice: Subject to any disclaimer, the term of this patent is extended or adjusted under 35 U.S.C. 154(b) by 544 days.

(21) Appl. No.: 14/003,567

(22) PCT Filed: Mar. 6, 2012

(86) PCT No.: PCT/EP2012/000986
§ 371 (c)(1),
(2), (4) Date: Nov. 13, 2013

(87) PCT Pub. No.: WO2012/119758
PCT Pub. Date: Sep. 13, 2012

(65) Prior Publication Data
US 2014/0060028 A1    Mar. 6, 2014

(30) Foreign Application Priority Data

Mar. 8, 2011   (DE) .................... 10 2011 013 329

(51) Int. Cl.
*F03B 13/06* (2006.01)
*H02J 15/00* (2006.01)
(Continued)

(52) U.S. Cl.
CPC ............... *F03B 13/06* (2013.01); *F03D 9/10* (2016.05); *F03D 9/11* (2016.05); *H02J 15/003* (2013.01);
(Continued)

(58) Field of Classification Search
CPC .... F03B 13/06; F03B 9/02; F03B 9/10; F03B 9/11; F03D 9/025; H02J 15/03;
(Continued)

(56) References Cited

U.S. PATENT DOCUMENTS 4,163,904 A * 8/1979 Skendrovic ............. F03B 13/10
   277/369
4,321,475 A * 3/1982 Grub ....................... F03B 13/06
   290/52

(Continued)

FOREIGN PATENT DOCUMENTS

DE    2843675    4/1980
JP    S5551969   4/1980

(Continued)

OTHER PUBLICATIONS

Tranlsation of JPH03294662 A: JP 3 294662 A to Tokyo Electric Power Co., Dec. 25, 1991.*

(Continued)

*Primary Examiner* — Logan Kraft
(74) *Attorney, Agent, or Firm* — Reising Ethington PC

(57) ABSTRACT

A pumped storage power plant for a temporary reversible storage of energy, such as the energy available from wind power stations and/or photovoltaic systems that is fluctuating over time. The pumped storage power plant is designed as an underwater pumped storage power plant, wherein the ocean assumes the function of an upper storage basin and a pressure tank placed on the ocean floor serves as a lower storage basin. The storage of the electric energy takes place through pumping water out of the inside of the pressure tank against the hydrostatic water pressure on the ocean floor.

14 Claims, 7 Drawing Sheets

(51) Int. Cl.
*F03D 9/10* (2016.01)
*F03D 9/11* (2016.01)

(52) U.S. Cl.
CPC ............... *Y02E 10/22* (2013.01); *Y02E 10/72* (2013.01); *Y02E 60/17* (2013.01); *Y02E 70/30* (2013.01)

(58) Field of Classification Search
CPC ........ H02J 15/003; Y02E 10/22; Y02E 10/72; Y02E 60/17; Y02E 70/30
USPC .......................................................... 60/398
See application file for complete search history.

(56) References Cited

U.S. PATENT DOCUMENTS

| | | | | |
|---|---|---|---|---|
| 4,364,891 | A | * 12/1982 | Saggese | B28B 21/56 264/263 |
| 4,711,601 | A | * 12/1987 | Grosman | E02B 17/00 405/195.1 |
| 4,784,560 | A | * 11/1988 | Haahjem | B63B 27/22 198/516 |
| 5,592,816 | A | * 1/1997 | Williams | B63B 35/44 415/7 |
| 6,672,054 | B2 | * 1/2004 | Merswolke | F03D 9/001 60/398 |
| 7,373,892 | B2 | * 5/2008 | Veazey | A01K 61/005 114/65 A |
| 7,743,609 | B1 | 6/2010 | Brostmeyer | |
| 2005/0271501 | A1 | 12/2005 | Walters | |
| 2008/0041291 | A1 | 2/2008 | Horton | |

FOREIGN PATENT DOCUMENTS

| | | |
|---|---|---|
| JP | 58 178878 A | 10/1983 |
| JP | 3 294662 A | 12/1991 |
| JP | 2004108357 | 4/2004 |
| JP | 2010520404 | 6/2010 |
| JP | 2010180528 | 8/2010 |

OTHER PUBLICATIONS

Japanese Office Action, Application No. 2013-557003, Date of Drafting: Oct. 14, 2015, Applicant: Yuzuru Okabe.
PCT International Search Report Dated: Jan. 2, 2013 PCT App No. PCT/EP2012/000986 Filed: Mar. 6, 2012.
English translation of Internatinal Preliminary Examination Report, International Application No. PCT/EP2012/000986, International Filing Date: Mar. 6, 2012, 10 pgs.

* cited by examiner

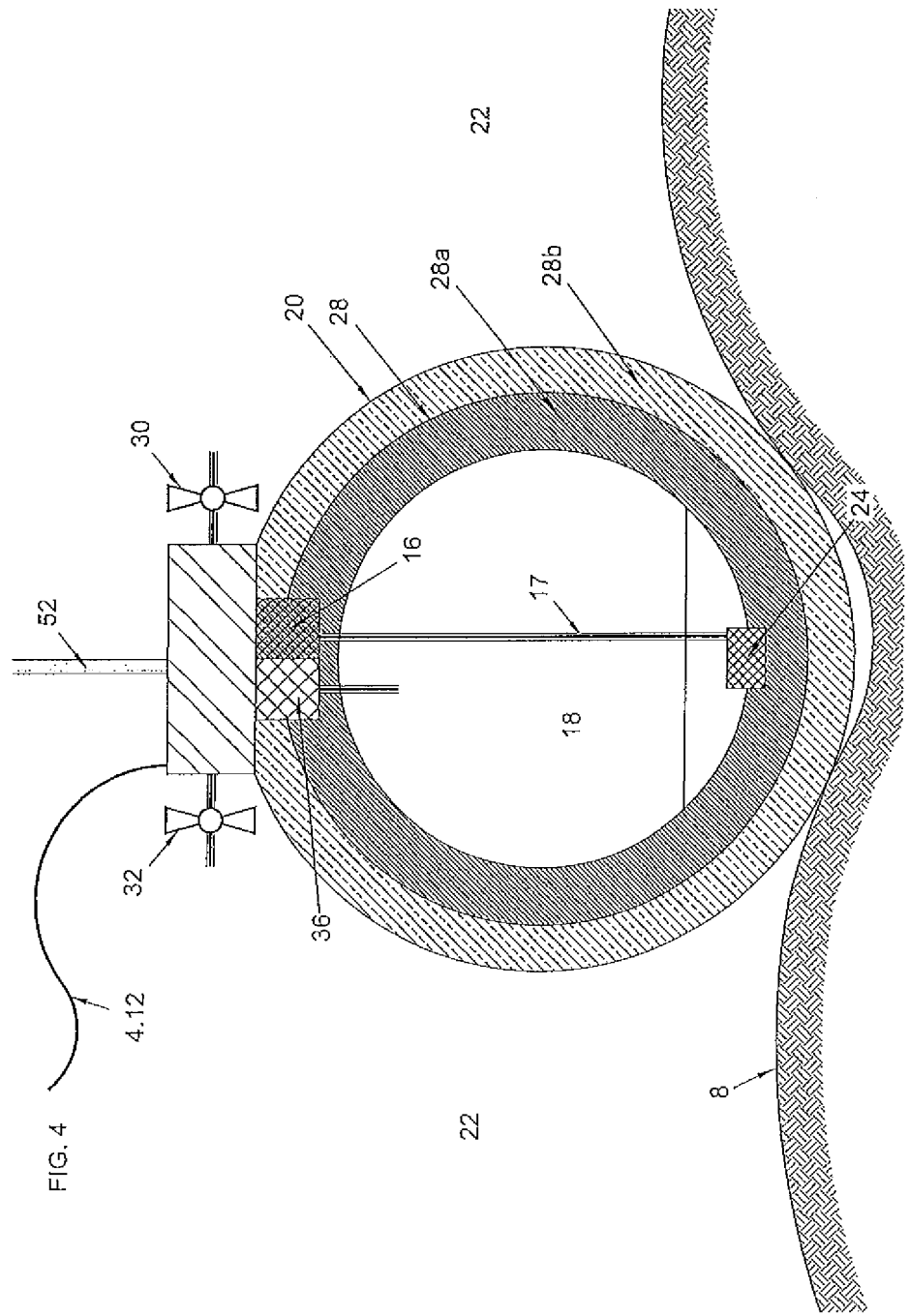

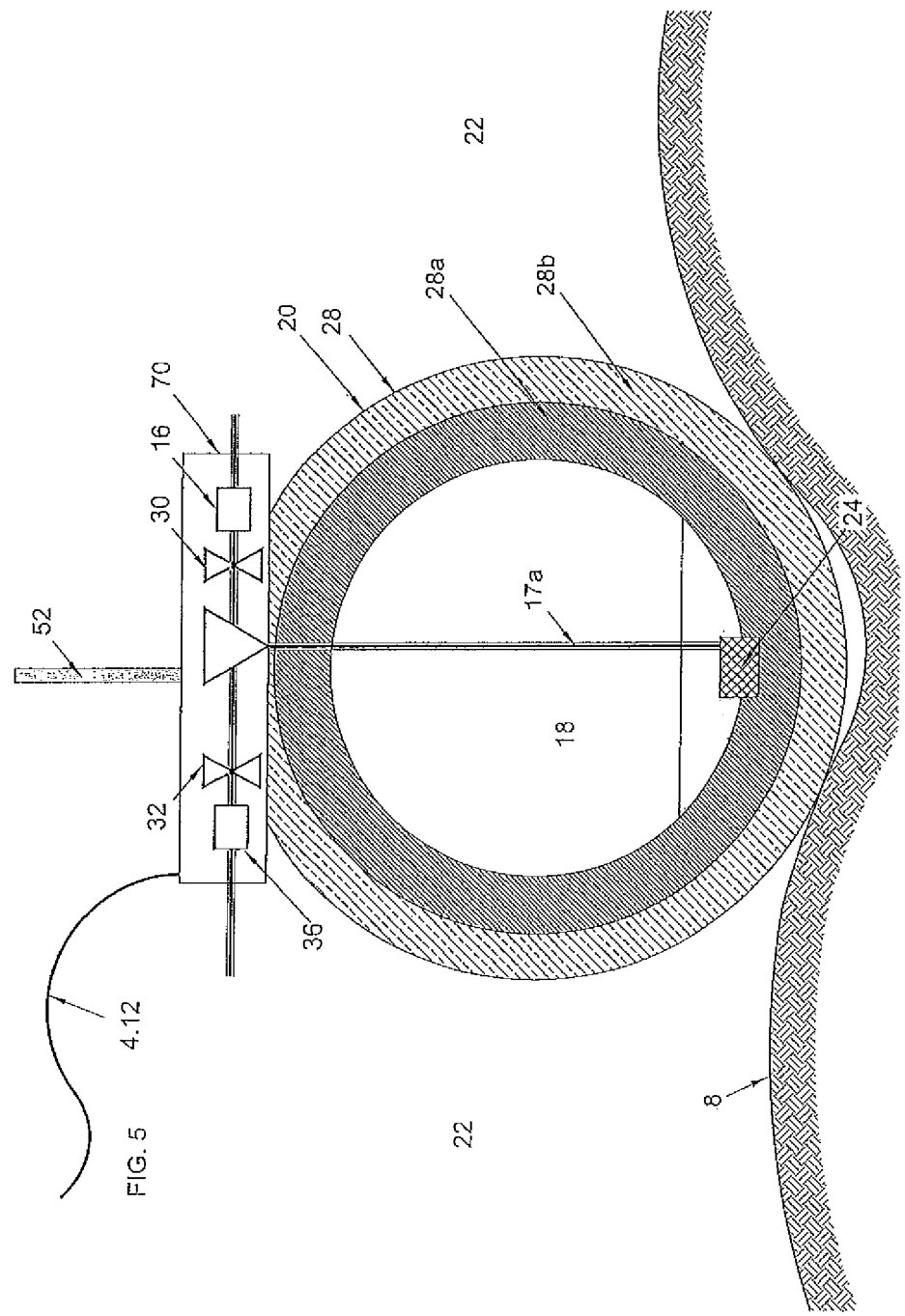

PUMPED-STORAGE POWER PLANT

TECHNICAL FIELD

This disclosure relates to a pumped storage power plant for a temporary reversible intermediate storage of energy, such as energy from wind power stations and/or photovoltaic systems whose availability fluctuates over time.

BACKGROUND

Nature is organized in such a way that a large portion of the solar energy absorbed by the surface of the earth in tropical and subtropical areas is converted into wind energy. As such, it is then transported to the northern hemisphere, for example, to Europe, the Atlantic, the North Sea, etc. Per square meter of surface, the wind constitutes a force which corresponds, on average, to a power of approximately 1 kilowatt. One can utilize this energy by means of modern wind power stations. However, because of the fact that the wind doesn't blow all the time, an industrial society can use wind power as a reliable energy source only if the electric energy thus generated can be stored to a sufficient extent and for a period of at least hours, possibly days. The same applies to electric energy generated by photovoltaic systems.

If such storage can be achieved on a large scale, these regenerative sources of energy could be better used to cover the basic load, and one day in the future they might entirely replace fossil fuels and nuclear power.

Traditional storage techniques for electricity, such as conventional or rechargeable batteries, can store only a tiny fraction of the required energy. Additionally, they are very expensive and therefore on a grand scale not acceptable from an economic point of view. Because of heat loss, the chemical storage methods frequently discussed today (for example, electrolysis of water) and compressed air storage show a relatively poor efficiency in recovering the stored energy. An efficiency in the order of about 30 percent would already be good values for such types of storage.

By today's standards, only water pumped storage power plants (pumped-storage hydroelectricity, PSH) remain useful for efficiently storing large amounts of electric energy. These can recover the stored energy with an efficiency of approximately 80 percent. In these plants, at times of excess electricity, water—mostly from artificial lakes—is pumped from a lower reservoir to an upper reservoir. The larger the reservoirs and the greater the height difference, the more energy can be stored. At times of increased power demand, the water which has been pumped up as described is allowed to flow through turbines back into the lower reservoir. In this process the difference of the potential energy of the water is converted into electric energy. The power W depends on the product of the height difference h between both reservoirs times the water flow rate M. Assuming a water density of 1000 kg/m$^3$, the following simple formula applies: $W (kW) = 9.81 \times M (m^3/s) \times h (m)$. This results in a total capacity of the energy storage facility of $E (kWh) = 9.81 \times M \times h \times t/3600$ (hours). t is the maximum period of time for lowering the water level in the upper reservoir in hours. In a pumped storage power plant, the pumping, storage and power generation phases are constantly alternating. Pumped storage power plants can be started quickly and can therefore promptly react to increased power demand. Currently, Germany has approximately 30 pumped storage power plants. Because of the required height differences, they are located in medium or even high mountain ranges. The largest plants in Germany can be found near Goldisthal, Thuringia (power approximately 1 gigawatt and energy storage capacity approximately 8.5 GWh with a useful volume of approximately 12 million cubic meters) and Markersbach, Saxony (power approximately 1 gigawatt and energy storage capacity approximately 4 GWh). Altogether, the power of all pumped storage power plants in Germany amounts to almost 7 gigawatts.

However, the demand for such pumped storage power plants exceeds the potential typically available. Energy storage facilities close to power production plants are highly desirable, for example, in the case of offshore wind energy. Therefore, it is an important economic task to develop these capacities (see, for example, Energie-Forschungszentrum Niedersachsen [Energy Research Center, Lower Saxony], Goslar, http://www.efzn.de). Currently, the construction of new pumped storage power plants in the mountains and in abandoned mines is being discussed as a possibility for developing these capacities. The use of underground mining sites requires large-scale above-ground water storage. Such construction often fails due to existing residential developments or other preexisting uses. Moreover, the existing empty volumes in mining sites are small and distributed over long underground conduits, making it difficult to realize efficient power stations. Furthermore, storage sometimes requires long power transmission routes and severe intervention in the natural environment. Generally speaking, the global availability of suitable locations for such pumped storage power plants is limited.

Therefore, we present a completely different approach for new pumped storage power plants which, at first glance, may perhaps seem unrealistic.

GENERAL DESCRIPTION

One object of the present disclosure is to provide an innovative pumped storage power plant, which is almost infinitely scalable and which can provide an enormous storage capacity without affecting the scenery.

The problem of the present disclosure is solved by means of the subject matter of the independent claims. Advantageous developments of the present disclosure are defined in the sub-claims.

This disclosure involves the basic idea of employing the ocean as the upper storage basin or water reservoir of a pumped storage power plant. A pressure tank placed on the ocean floor is used as lower storage basin or water reservoir. Therefore, the lower water reservoir (the one with the lower potential energy) is an artificially created hollow space formed by the pressure tank.

According to the present disclosure, an underwater pumped storage power plant is provided for the purpose of temporary reversible intermediate storage of electric energy from other power stations, such as power stations whose output fluctuates over time, e.g. wind power stations or photovoltaic systems.

Like any pumped storage power plant, the pumped storage power plant uses a first and a second water reservoir, wherein the water in the second water reservoir comprises higher potential energy than the water in the first water reservoir. For temporary reversible storage of electric energy, water from the first water reservoir is pumped into the second water reservoir, and for recovery of the electric energy, the water from the second water reservoir is allowed to flow back into the first water reservoir, whereupon a generator converts the potential energy deposited during the pumping process into electric energy. The storage and recovery of electric energy depends merely on the potential energy difference of a water volume between the two water reservoirs. In a conventional pumped storage power plant, that is defined by the height differences between the two basins.

In the present disclosure, the first water reservoir with the lower potential energy is formed by an artificial pressure tank that can be filled with water. This tank is placed at great depth on the ocean floor. The pressure tank has a pressure-resistant design, so that it remains dimensionally stable against the hydrostatic water pressure at the desired depth when it is pumped out. The second water reservoir with the higher potential energy is formed by the ocean surrounding the pressure tank. When water is allowed to flow into the pressure tank located at a specific water depth T, the potential energy, which corresponds to the height difference to the ocean surface, i.e., the water depth T, is released. When subsequently the water is pumped out of the pressure tank into the surrounding ocean against the hydrostatic pressure $P_T$ in the water depth T, the electric power corresponding to the water column pressing on the pressure tank in the water depth T has to be expended. This expended energy is stored, albeit reduced by the otherwise usual power losses.

The water is pumped out of the pressure tank without being replaced by atmospheric air. This results in a vacuum which is limited only by the partial pressure of the water vapor. Therefore, strictly speaking, the atmospheric air pressure has to be added to the hydrostatic pressure of the water column. However, in the great ocean depths targeted here, this is quantitatively no longer of any significance. Nevertheless, if used in a lake with little depth, the additional 1 bar of the atmospheric pressure, which corresponds to an additional depth of 10 m, should be included in the calculation.

For this purpose, the pressure tank comprises a water outlet which has a pump that is arranged directly at the pressure tank. By means of the pump, the water is pumped out of the pressure tank directly into the surrounding ocean against the hydrostatic pressure $P_T$ corresponding to the water depth, wherein the pump converts electric power into the potential energy corresponding to the displaced water column.

Furthermore, the pressure tank comprises a water inlet which has a generator that is arranged directly at the pressure tank. When water is allowed to flow with the hydrostatic pressure corresponding to the water depth from the surrounding ocean into the pressure tank, the generator converts the potential energy of the previously displaced water column back into the corresponding amount of electric energy. In addition, the pressure tank comprises valves at the inlet and outlet, in order to close the inlet and outlet when no energy is stored or recovered. Therefore, the pumping out and inflow of the water takes place only using the short route through the wall of the pressure tank. The wall is closed except for the water inlet and water outlet.

If the pressure tank is placed at a depth of, for example, 2000 m below the ocean surface, it corresponds to a pumped storage power plant in which the second water reservoir is located 2000 m above the first water reservoir, which would already be an unusually great height difference for conventional pumped storage power plants. Surprisingly, however, no long pipes to transport the water used for storing the electric power across a distance of 2000 m (at a slope different than 90° even more) are required. It is already sufficient to pump the water from the inside of the pressure tank to the outside into the surrounding ocean, and to allow the water to flow back. This corresponds to a distance of just a few meters. That is to say, the short pumping distance is independent of the potential energy difference. Therefore, only electric power lines for transporting the electric power from the ocean surface to the pressure tank and back are required. The potential energy difference resulting from gravity is applied only by the water column pressing on the pressure tank at the water depth T, without overcoming the distance. Hence, no pipes for transporting water or air ducts between the pressure tank and the ocean surface are needed. What is used is just the potential energy difference of the ocean depth. However, it should not be excluded that the pumped storage power plant could also be placed in a deep inland lake.

Moreover, by means of the present disclosure, one of the two storage basins, or defined water reservoirs, is entirely "spared" because the surrounding ocean forms the second water reservoir (with the higher potential energy). The first water reservoir is formed by the internal hollow space of the pressure container or pressure tank. Therefore, the pressure tank forms an enclosed water storage volume, i.e., the water storage volume or water reservoir with the lower potential energy in comparison to the surrounding ocean. As a result, it is not required to use long water pipes such as are used in conventional pumped storage power plants to bridge the height difference. This does not only simplify construction, it also contributes to reducing friction losses during the process of transporting the water, thus allowing for an increase in efficiency. In other words, the water inlet and/or the water outlet, or a combination of water inlet and outlet, are e.g. arranged directly at the pressure tank, without having to use long hoses or pipes to lead, for example, to the water surface. Furthermore, a large number of such pressure tanks can be placed on the ocean floor in order to achieve a sufficiently large water storage volume, and thus the desired energy storage capacity, without covering above-ground landscape. In the case of a plurality of pumped storage power plants, it is preferred that each pressure tank is provided with its own pump(s) and generator(s) so that the pressure tanks have to be connected with each other only electrically. Preferably, such a network of underwater pumped storage power plants comprises a plurality of pressure tanks located on the ocean floor, which have been electrically connected on the ocean floor with a network of electric cables. A network of water pipes to connect the various pressure tanks that are each provided with a pump and a generator of their own is not required.

Alternatively, it is also possible that a pressure tank with an optimum structure and design is too small to fully exploit the capabilities of suitable pump and turbine systems. (The pressure tank is a building situated on the ocean floor which when filled has a considerable weight.) In that case, a plurality of pressure tanks can be interconnected with pressure lines for hydraulic performance, and the process of filling and emptying takes place at one specific point in the group. Naturally, the hydraulic connections must be provided in a manner that allows for unrestricted inflow and outflow of the water.

The pressure tank in the preferable case, or the group of pressure tanks hydraulically interconnected in the alternative case, should have a volume which allows for the storage of a significant amount of energy. The volume should therefore amount to at least 100 or 1000 cubic meters. However, it can be several times, if necessary several orders of magnitude greater. It is even possible to use volumes in the range of one million cubic meters or more. The larger the individual pressure tanks, the lower the required number.

For example, large industrially manufactured spherical tanks can be used as pressure tanks. A spherical tank with a diameter of 100 meters has a volume of 500,000 cubic meters. If 50 cubic meters of water per second flow through the turbines, this pumped storage power plant, if located at a water depth of 2000 m, supplies a power of approximately 1 gigawatt for a period of approximately 3 hours. By using several of these spherical tanks, the power can be increased correspondingly, achieving an even greater storage capacity. Therefore, it is possible to store large amounts of renewable energy.

The pressure tanks may, for example, consist of steel and/or concrete, e.g. reinforced concrete, i.e., they may comprise a three-dimensionally closed outer wall, for example, consisting of reinforced concrete. With these materials, it is possible to build a sufficiently pressure-resistant pressure tank or hollow body.

It is preferred that the pressure tank is built in a massive manner or weighted in such a way that in an empty state during normal operation it has a mass that is slightly greater than the mass of the water displaced by the pressure tank, such that, during normal operation, the pressure tank will sink down to the ocean floor even in a pumped-out state, thus keeping anchoring efforts on the ocean floor within limits. If the pressure tank during normal operation is heavy enough at any filling level, it can even just lie on the ocean floor without significant anchoring. However, the possibility of the pressure tank being slightly lighter than the displaced water and being anchored to the ocean floor shall be considered and not be ruled out.

The pressure tank comprises separate hollow spaces, for example, in the wall of the tank, wherein bulk material can be filled into the hollow spaces as ballast. In this way the mass of the pressure tank can be adjusted later in such a way that the pressure tank is heavy enough to sink to the ocean floor. However, the pressure tank can be filled with bulk material only to the extent that it still floats initially and to add ballast water on-site on the ocean. In a cost-effective manner, the ballast can comprise natural bulk material, for example, sand, gravel, mud or the like, and the mass can be increased on-site by adding water to the bulk material, so as to balance the mass of the pressure tank more precisely on-site. By adding ballast water to the bulk material, the mass can be increased to the extent that the pumped storage power plant sinks down. However, it is also possible to fill separate hollow spaces with ballast water, which would make it easier to pump out the ballast water in order to lift the pumped storage power plant up again. The total amount of ballast is calculated in such a way that during normal operation the pressure tank is kept on the ocean floor. In the exemplary case of using a spherical tank, the weight distribution, for example, the arrangement of the ballast, should be asymmetric, so that under water the pressure tank has a defined orientation with upper and lower side, which would facilitate the placement of pumps and generators.

According to a preferred embodiment of the present disclosure, the pressure tank has an additional water storage area, which during normal operation is not used for storing energy. The water storage area can be emptied to reduce the mass of the storage reservoir to the extent that it can be lifted from the ocean floor to the ocean surface. The additional water storage area can be created by not completely emptying the main cavity during normal operation, or by providing one or several separate hollow spaces, for example, in the wall of the tank. Therefore, by emptying the additional water storage area, the mass of the pressure tank can be reduced to the extent that the pressure tank rises to the surface by itself or can be pulled up with a rope. Consequently, the pressure tank forming the water storage volume with the lower potential energy can be lowered to the ocean floor and can be brought back to the water surface. As a result, it is possible to perform maintenance and repair work at the surface.

The pressure tank can be designed in the form of a sphere. However, the pressure tank can also be designed in the form of a torus made of a ring closed in itself and consisting of pressure-resistant pipes or being cylindrical, having, for example, arched end surfaces. A torus cannot roll on the ocean floor. In this regard, an oval shape can also be used.

The water inlet and water outlet can be designed as separate entities or combined. In the latter case, preferably the pump and the generator are designed as a common pump-turbine. In this case, a common valve at the combined water inlet and outlet is sufficient. In this way, the number of openings in the outer wall of the pressure tank and the number of valves can be reduced, wherein nonetheless a plurality of pump-turbines may be present.

Therefore, with the underwater pumped storage power plant, it is possible to provide a power supply network which comprises the following:

A plurality of power stations which generate electric power that is fluctuating over time, such as wind power stations and/or photovoltaic systems,
one or several underwater pumped storage power plants,
a plurality of consumption sites for electric power, and
an electric supply network, which connects the consumption sites, the underwater pumped storage power plants and the power stations with one another, so that during periods of an energy surplus coming from the power stations the electric energy generated by these power stations can be reversibly stored intermediately and during periods of high demand for electric energy it can be recovered, and the recovered electric energy can be directed to the consumption sites.

Subsequently, the present disclosure is explained in more detail by means of embodiments and with reference to the figures, wherein identical and similar elements are partially provided with the same reference numerals, and the features of the different embodiments can be combined with one another.

DESCRIPTION OF THE DRAWINGS

FIG. 4 is a schematic view of a further embodiment of the underwater pumped storage power plant.

FIG. 5 is a schematic view of a further embodiment of the underwater pumped power plant.

DETAILED DESCRIPTION

Figure 1:
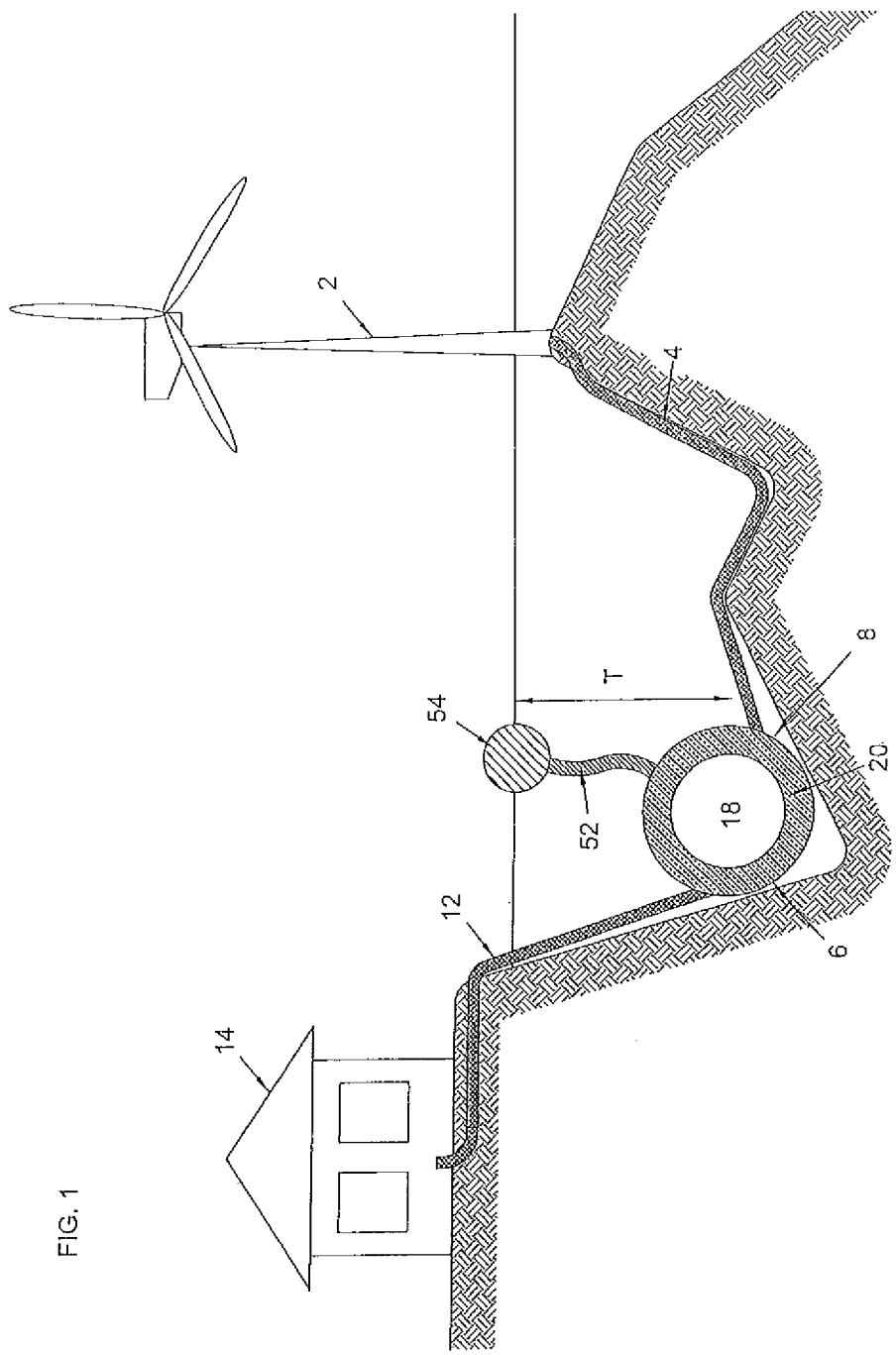
FIG. 1 is a schematic view of an underwater pumped storage power plant with wind power station and consumer.

With reference to FIG. 1, electric power is generated figuratively by means of a specific electric power station, in this example by means of a wind power station 2. The wind power station 2 is connected with the pumped storage power plant 6 by way of a power line 4, in order to direct the electric power from the primary power station to the pumped storage power plant 6. The pumped storage power plant 6 is situated on the ocean floor 8 at a water depth T which, depending on the available geographic conditions, can amount to between several hundred and several thousand meters. Furthermore, the pumped storage power plant 6 is connected with a consumer 14 by way of a power line 12, in order to direct the electric power from the pumped storage power plant 8 to the consumer.

It shall be noted that the wind power station 2 shown can represent a plurality of wind power stations and that it is possible to use even different regenerative fluctuating power stations, such as photovoltaic systems. Also the consumer 14 can represent a plurality of consumers which are connected to the existing part of the general power supply network to which the electric energy recovered from the pumped storage power plant 6 is supplied when demand exceeds the power already provided by primary power stations. The power lines 4 and 12 drawn represent the connection to the general power supply network, with its integration of current sources and current sinks.

Figure 2:
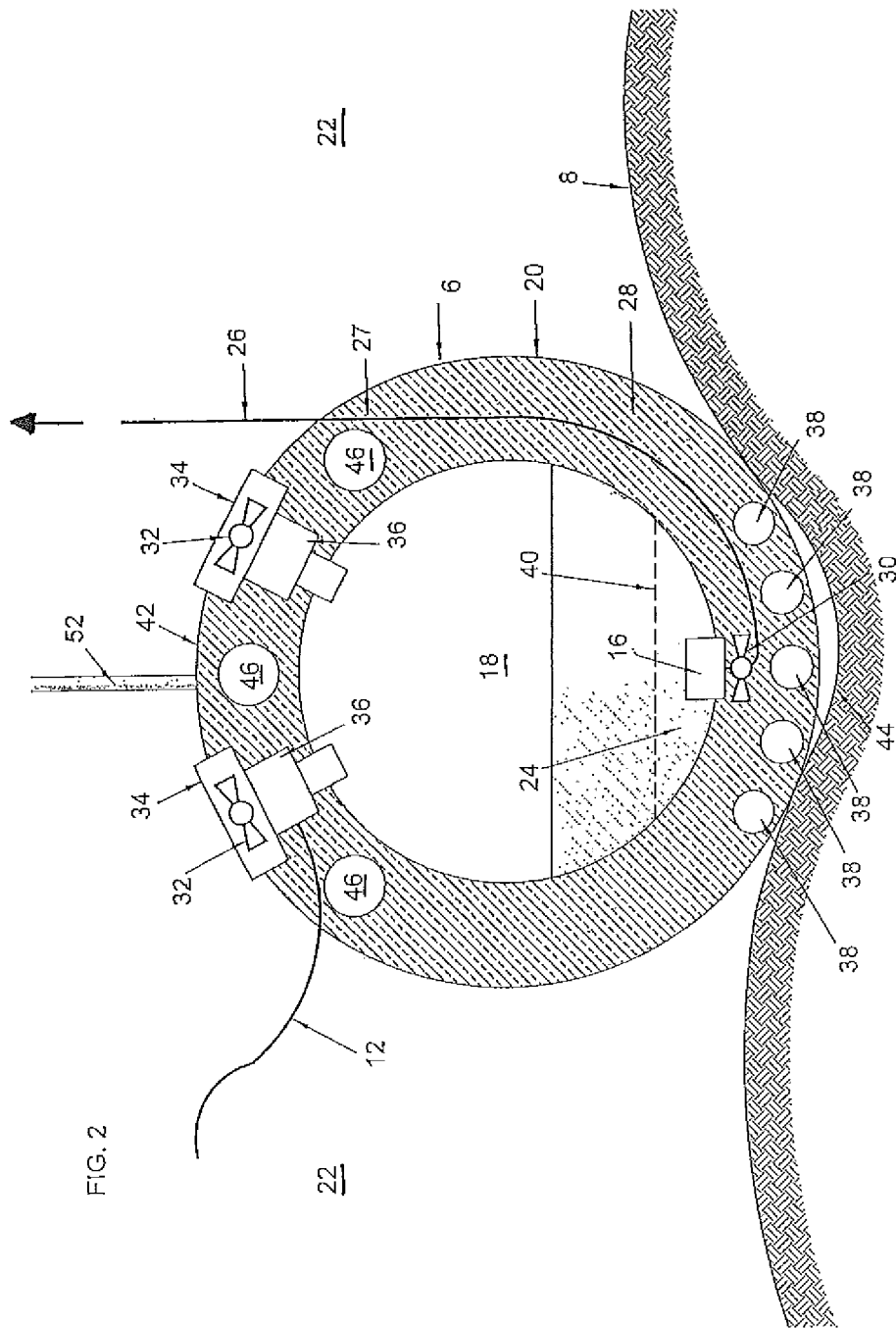
FIG. 2 is a schematic view of the underwater pumped storage power plant shown in FIG. 1 during the process of storing energy.

FIG. 2 shows that during storage operation by means of a pump 16 water is pumped out of the internal cavity 18 of the pressure container or pressure tank 20 into the surrounding ocean 22. The pump 16 sucks the water from the sump 24 and pumps the water through a water outlet 26 directly into the surrounding ocean. Therefore, the internal cavity 18 of the artificial pressure tank 20 forms one of the two water reservoirs of the pumped storage power plant (that is, the one with the lower potential energy).

In this example, the water outlet comprises a water conduit 27 which extends upward inside the reinforced concrete wall 28 of the pressure tank 20. The water outlet 26 has been arranged directly at the pressure tank 20, i.e., the water conduit 27 ends directly outside of the pressure tank 20 and is, for example, not directed to the ocean surface. The water outlet 26 or the water conduit 27 can be closed by means of a shut-off valve 30. Because of the fact that the pump 16 has to pump the water against the hydrostatic pressure $P_T$ existing in the water depth T, a large amount of electric power is used and converted into potential energy, as is shown by the following examples. The pressure tank 20 stores an amount of energy E in kilowatt hours as a function of the volume V of the water to be stored in cubic meters and the water depth T in meters and with a density of water of 1000 kg/m³:

$$E(kWh)=V(m^3) \times T(m) \times 9.81/3600$$

For example, with a volume V=10,000 m3, a water depth T=2000 m and a spherical pressure tank 20 having a cavity diameter of 28 m, it is possible to store electric energy E of approximately E=58,000 kWh=58 MWh. This means that a power of approximately 10 megawatts can be provided over a period of 6 hours. If the pumped storage is recharged on a daily basis by means of wind or photovoltaic power, i.e., the storage volume V is filled and emptied once every day, a yearly amount of stored energy of about 20,000 MWh is achieved.

However, it seems to be also possible to build even larger pressure tanks 20. A spherical pressure tank 20 with a diameter of 280 m has an approximate volume of V=10,000,000 m³. When assuming a placement depth T=2,000 m, it is possible to store an approximate amount of energy E=58,000 MWh. This corresponds to a performance of approximately 5 gigawatts over a period of approximately 12 hours. With such a spherical pressure tank 20, it would be possible to store the amount of energy generated over a period of almost 10 hours by 1000 wind power stations 2, each with a power of 6 megawatts. If the pumped storage is recharged on a daily basis by means of wind power, i.e., the storage volume V is filled and emptied once every day, a yearly amount of energy of 20,000 GWh is achieved.

Figure 3:
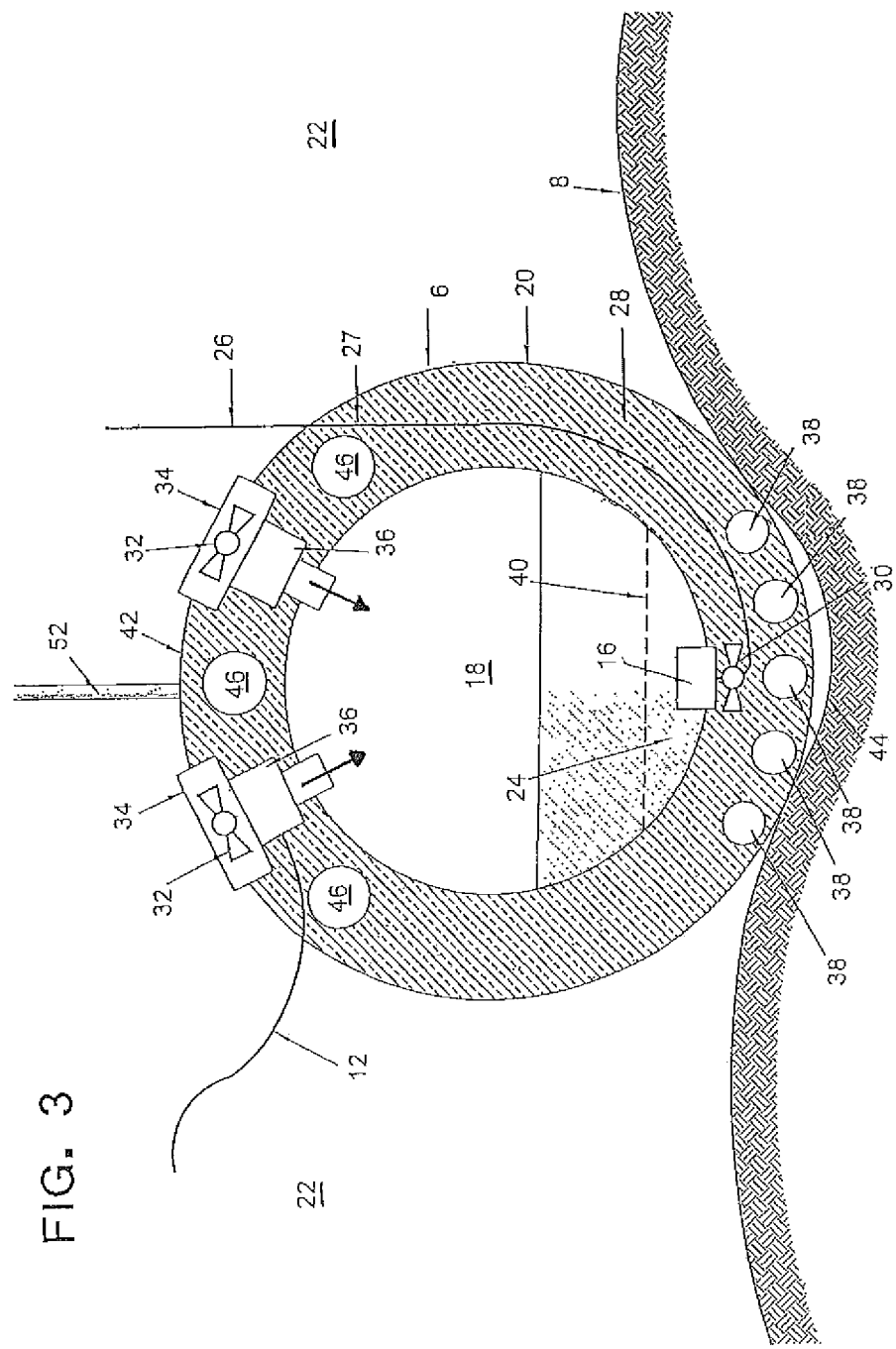
FIG. 3 is a schematic view of the underwater pumped storage power plant shown in FIG. 1 during the process of recovering energy.

FIG. 3 shows that for recovering the energy stored in the emptied pressure tank 20 of the pumped storage power plant 6, an inlet valve 32 is opened and the water flows through a water inlet 34 from the surrounding ocean with the hydrostatic pressure $P_T$ corresponding to the water depth T through a turbine 36 into the internal cavity 18 of the pressure tank 20, wherein the energy stored during the process of emptying, less the usual power losses, is recovered. The water inlet 34 is arranged directly at the pressure tank 20, i.e., no pipe is directed to the ocean surface. By means of the power line 12, the recovered electric power is fed into the general power supply network. To increase the performance, several water inlets 34 with valves 32 and turbines 36 can be provided. In this example, there are two, respectively. To prevent the pressure tank form vibrating as a result of the strong water flow, the internal cavity 18 can be reinforced with bars (not shown). At the same time, the crossbars can have a double function. On the one hand, they can stabilize the pressure tank and, on the other hand, they can cause turbulences in the water flowing through the generator into the internal cavity 18, in order to prevent resonance vibrations in the pressure tank 20.

The pressure tank 20 includes a spherical reinforced concrete wall 28. The wall thickness is chosen depending on the water depth T at which the pumped storage power plant is placed and depending on the mass required for the pumped storage power plant to sink. The turbines 36 and the pumps 16 have been arranged directly at the pressure tank 20, i.e., inside the wall 28 or directly on the wall 28. In order to store and recover the electric energy, the water is merely directed across a short distance, namely only through the inlet or outlet openings 34, 26, that is, through openings in the wall 28 of the pressure tank 20. Therefore, the pumped storage power plant 6 requires only power lines 4, 12 from the ocean surface to the ocean floor, but no pipes or conduits for transporting water. It may even be enough to have a single power line for supplying and draining power. Furthermore, the pressure difference resulting from the great water depth does not necessarily depend on the filling level inside the pressure tank 20, so that the available performance remains basically constant regardless of the filling level.

The wall 28 of the pressure tank 20 has hollow spaces 38 which are filled with bulk material, for example, sand, in order to balance the mass of the pumped storage power plant 6. If necessary, the sand can be applied in a ring coaxially about the pressure-resistant casing or in any other area where weight is to be applied. Preferably, the pumped storage power plant 6 is initially balanced in such a way that it still floats when it is completely pumped out, so that it can be transported by a ship to the place where it is to be submerged. At the place where the pumped storage power plant 6 is to be submerged, the pressure tank 20 is filled with ballast water to the extent that the pumped storage power plant 6 sinks down. The amount of water used as ballast water is only used as ballast weight. During normal operation, i.e., when storing and recovering the electric power, it is not pumped out, so that during normal operation the pumped storage power plant 6 always has a mass that is greater than the displaced water and thus remains on the ocean floor 8. In the example shown, the corresponding storage area is marked with a dotted line 40. However, the storage area 40 for the ballast water can also be formed by separate hollow spaces (not shown). For example, to perform maintenance work, the additional ballast water which, during normal operation, is not used for storing energy can be pumped out so that the pumped storage power plant 6 rises again, or becomes at least so light that it can be pulled up, for example, with a rope 52, which is marked at the ocean surface by a floating buoy 54.

The weight distribution of the pressure tank 20 is arranged to be asymmetrical so that the pressure tank 20 has a defined orientation with an upper side 42 and a lower side 44 due to the weight distribution. This can be achieved, for example, through the arrangement of the hollow spaces 38, notably in the case of a spherical pressure tank 20. In the present example, the upper hollow spaces 46 are empty, in order to create a lift, and the lower hollow spaces 38 are filled. It is preferred that the water inlets 34 and the turbines 36 are arranged on the upper side 44 so that the water flows in from the upper side. The sump 24 has been arranged on the lower side 42, and the pump 16 is located directly at the sump 24 on the lower side 42 of the pressure tank 20, or it is connected with the sump by means of a pipe (not shown).

Because of the enormous weight of the pressure tank 20, it would be useful to build the pressure tank while floating in the water, for example, in floating condition pouring step-by-step sections of reinforced concrete. During manufacture, the unfinished pressure tank should protrude out of the water to the extent that its internal cavity 18 could not fill with water, even during a storm. The thickness of the wall 28 of the pressure tank has to withstand the extremely strong hydrostatic water pressure. It also has to provide the pressure tank 20 with a dead weight that is high enough so that the pumped storage power plant sinks to the ocean floor 8 when the internal hollow space is at least nearly empty. The wall material can be, for example, reinforced concrete. The structure is engineered such that the pressure tank 20 can withstand a pressure considerably higher than the one occurring at the ocean floor 8 without being damaged. In the wall 28, all system-relevant components, such as valves 30, 32, turbines 36, pumps 16, pipes 27 and/or power lines, etc. are integrated so that they can fulfill their functions for many decades to come. The monitoring and control electronics have also been arranged directly at the pressure tank 20 and are submerged together with the tank 20.

FIG. 4 shows an alternative embodiment of the pumped storage power plant 6, in which the pump 16 has been arranged on the upper side 42 of the pressure tank 20, sucking the water from the sump 24 by means of a suction pipe 17 inside the cavity 18. The outer wall 28 includes a double-layer, wherein the internal layer 28a forms the pressure-resistant casing of the pressure tank 20. The outer layer 28b mainly just acts as ballast.

FIG. 5 shows a further alternative embodiment of the pumped storage power plant 6 and represents a simplification and modification of the embodiment shown in FIG. 4. The pump 16, the generator 36 and the valves 30 and 32 are combined to form a compact pump-generator unit 70 outside of the pressure-resistant layer 28a. The valves 30 and 32, of which during pump or generator operation always only one is opened and the other one is closed, end in a T-piece 71 which is connected with a combined suction and outlet line 17a that is directed into the cavity 18. Depending on the operating mode, the line 17a is used for suction pipe of the pump 16 or as outlet line for the turbine 36. The sump 24 can be designed in such a way that it can be used also as outlet orifice for the water flow discharged by the turbine.

With this arrangement, only a single hole through the pressure-resistant layer 28a is required.

Also, with this arrangement, the sensitive machine parts (pump, generator, valves) can be combined in a compact unit and are connected to the storage reservoir only at one place. In the event of repair, the pump-generator unit 70 merely has to be disconnected and pulled to the ocean surface.

Figure 6:
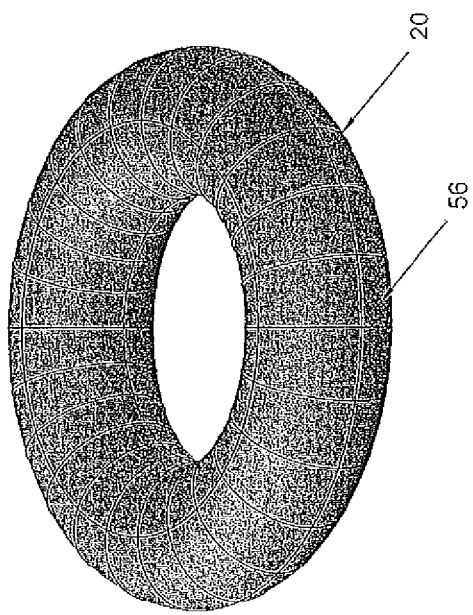
FIG. 6 is a schematic view of an alternative form of the pressure tank.

FIG. 6 shows an alternative embodiment of the pressure tank 20 in the shape of a torus. A torus-shaped pressure tank 20 is also pressure-resistant if it includes a closed ring of pressure-resistant pipe sections 56 and, once lying on the ocean floor 8, it cannot roll away. These pipe sections can be structurally optimized, for example, using spokes for reinforcement which results in the form of a "wheel". Possible construction materials of the spokes include concrete and steel. Compared to other buildings, such a pressure tank may not have particular requirements regarding the clearance of its volume. It is sufficient that the water can flow to the sump without any significant hydraulic hindrance. In addition, it is possible to avoid potential movements and vibrations of the body as a whole, for example, by designing individual rings. Similar considerations are also made with regard to the huge towers (magnitude: 1000 m height, 100 m diameter) which are designed to implement solar chimney power plants for using solar energy.

Figure 7:
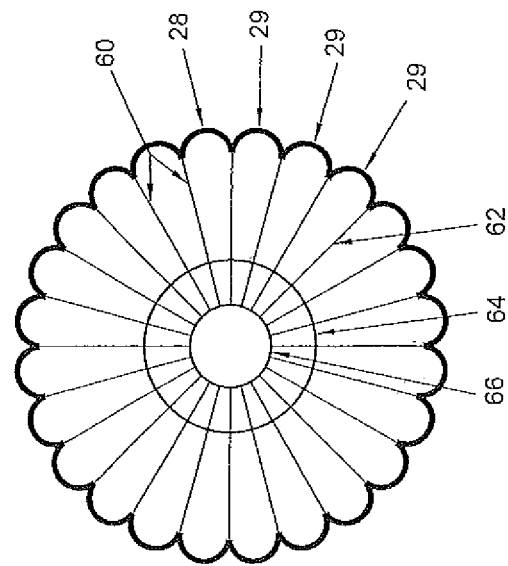
FIG. 7 is a schematic cross-section through a toric or cylindrical pressure tank.

FIG. 7 shows a cross-section through a toric or cylindrical pressure tank which is stabilized and supported by means of an internal supporting structure 60. The outer watertight layer 28 comprises cylinder segments 29 joined together. Their arched shape makes it possible to absorb higher pressure while using the same material thickness. The pressure is then absorbed by the supporting structure 60. The supporting structure has to be optimized by applying the methods of structural design. However, compared to conventional structures, the purpose and particular environment of this hollow body involve specific conditions which simplify the design:

For the inside of the pressure tank, it is only required that the water can flow to the sump 24 without any significant hydraulic resistance. Therefore, it is not necessary to construct "empty and clear halls". Instead, the pressure tanks may contain a supporting framework as a structurally optimized supporting structure. This results in a great variety of potentially innovative supporting structures, ranging from highly porous bulk material to delicate technical structures.

The pressure tank is located in a virtually thermostatic environment because the deep water of the ocean has an extraordinary temperature stability which changes only little even within geological periods of time. Since the storage volume 18 is filled with ambient water, the temperature does not even change due to operation. The temperature change effected by the pressure release of the water flowing through the turbine into the pressure tank is very low.

The pressure tank is located in a calm environment without "storms" or external currents. Minor disturbances result only from the process of filling and emptying the tank. However, these self-induced current disturbances can be controlled by using a sufficiently long and particularly shaped line for the outlet of the pump or the inlet of the turbine. Inlet and outlet can also be combined in a single line because the hollow body is not filled and emptied at the same time.

FIG. 7 shows a figurative supporting structure 60 with radial bars 62 for accepting the radial forces and circumferential connections 64 between the bars 62, for accepting lateral forces and for preventing the bars 62 from bending. The circumferential connections 64 could be pictured also as shells or tube shells which allow for short bars 62 to be used between radial planes. On the inside, the bars 62 are received by an inner cylinder 66.

The knowledge obtained in the context of constructing a wheel with regard to optimizing the arrangement and structure of spokes can be used for designing the supporting structure of the storage hollow body. Because of the large dimensions of the hollow body, it is also possible to use spoke constructions in order to connect several coaxial planes with one another.

The hollow body can also be shaped in such a way that the pressure tank 20 is filled with filling material. The top layer of this filling material includes smooth elements. The top layer is covered with a watertight and tear-resistant protective layer that still has some elasticity (similar to vacuum packaging). The elements of the filling material are meant form a highly porous arrangement inside the pressure tank 20. Inside this arrangement, water must be able to flow sufficiently well, i.e., the hydraulic resistance should low enough to allow still sufficient flow velocity when pumping the water in and out without experiencing excessive friction losses. For example, it is possible to use pebble stones as filling material. These pebble stones should be very similar in dimension in order to increase porosity. The following method could be used to obtain a porous underwater storage tank 20: A thin-walled hollow body is filled with filling material. The wall of this body is smooth on the outside, and covered with predetermined breaking lines. The wall also has a slightly elastic cover. Now this structure is subjected to high external hydrostatic pressure. At least parts of the predetermined breaking lines of the temporary hollow body break. Therefore, the wall at least partly turns into pieces of wall. However, the elastic cover seals the resulting breaklines. The water pressure causes a force-fit connection between the smooth pieces of wall and the filling material. Therefore, a storage body has been formed which includes a force-fit arrangement of the mechanically stable elements of filling material and the wall pieces. The latter protect the watertight cover while being pressed against the filling material. Porosity and water permeability are parameters for a water tank filled with filling material. An aquifer, which also includes "filling material" and which is characterized by its water permeability, can comprise cracks and crevices which facilitate the water flow. A technical reservoir can also be provided with "cracks" and "crevices" by using in specific areas, for example, coarse grained bulk material which channels the water flow.

Despite the high external hydrostatic pressure, within the hollow space 18 inside the underwater storage tank 20 only the hydrostatic pressure of the local water column exists during the process of filling and emptying the pressure tank 20. Therefore, in the case of hollow bodies mechanically stabilized by filling material, upright elongated structures are the more preferred the more fine-grained the filling material is.

Figure 8:
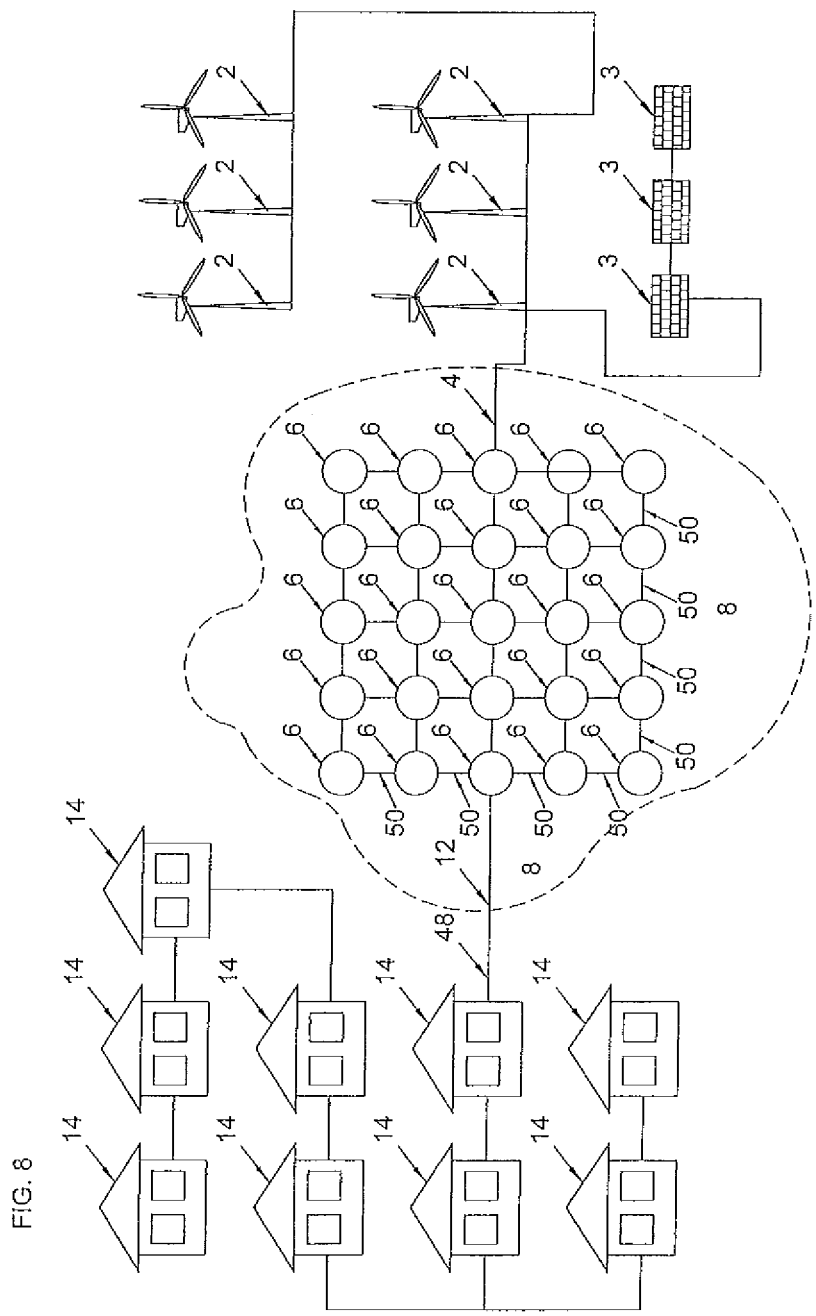
FIG. 8 is a schematic view of a power supply network with a plurality of power stations, underwater pumped storage power plants and consumers.

FIG. 8 shows a power supply network 48 having a plurality of interconnected consumers 14 and a plurality of interconnected wind power stations 2 and photovoltaic systems 3 which form the primary power stations. The primary electric energy generated by the primary power stations 2, 3 is stored temporarily by means of a plurality of pumped storage power plants 6, according to FIGS. 2 to 4. On the ocean floor 8, the various pumped storage power plants 6 are interconnected merely by means of electric underwater power lines 50. When required, the pumped storage power plants 6 supply the consumers 14 with the recovered electric power by means of the existing part of the power supply network 48.

To a specialist, it is apparent that the embodiments described above are to be viewed as examples and that the invention is not limited to these examples but can be varied in many ways without leaving the invention. Furthermore, it is apparent that also individually the characteristics define components of the present disclosure, independent of whether they are disclosed in the description, the claims, the figures or in any other way, even if they are described in combination with other characteristics.

The invention claimed is:

1. Underwater pumped storage power plant for a temporary reversible intermediate storage of electric energy from other power stations, comprising a pressure tank that can be filled with water and that can be lowered from the surface of an ocean to the floor of said ocean, wherein said pressure tank has a pressure-resistant design so that said pressure tank can be emptied while remaining dimensionally stable against the hydrostatic pressure on the ocean floor, wherein the pressure tank comprises a water outlet which has a pump arranged at the pressure tank for pumping water out of the pressure tank and into the surrounding ocean against the hydrostatic water pressure corresponding to the water depth, wherein the pump converts electric energy into potential energy corresponding to a water column displaced by pumping water out of the pressure tank into the surrounding ocean against the hydrostatic water pressure of the surrounding ocean, wherein the pressure tank comprises a water inlet which has a generator arranged at the pressure tank for allowing water to flow directly from the surrounding ocean into the pressure tank with the hydrostatic water pressure corresponding to the water depth, wherein the generator converts the potential energy of the previously displaced water column back into electric energy when the water flows in with the hydrostatic water pressure at the water depth of the surrounding ocean, wherein said underwater storage power plant comprises power lines for transporting the electric energy from the ocean surface to the pressure tank and back, and the pressure tank comprising at least one of:
a water storage area for ballast water, which during normal operation is not used for storing energy, which water storage area is pumped out to reduce the mass of the pumped storage power plant to the extent that it can be brought from the ocean floor back to the ocean surface, or hollow spaces for being filled with ballast material in order to increase the weight of the pressure tank, wherein the pumped storage power plant is initially balanced in such a way that its mass is smaller than the mass of the displaced ocean water so that the pumped storage power plant initially floats, and by filling bulk material and/or ballast water into the pressure tank at an intended site of sinking, the mass of the pumped storage power plant is increased to the extent that the mass of the pumped storage power plant becomes greater than the mass of the displaced water, resulting in the fact that the pumped storage power plant sinks down and comes to rest on the ocean floor.

2. Underwater pumped storage power plant according to 1, comprising a rope with a floating buoy for marking the position of the pumped storage power plant on the ocean surface and for lowering and pulling up the pumped storage power plant after the ballast water storage area has been emptied to perform maintenance and/or repair work.

3. Underwater pumped storage power plant according to claim 1, wherein the pressure tank has a volume of at least 100 cubic meters.

4. Underwater pumped storage power plant according to claim 1, wherein the pressure tank has been provided with a three-dimensionally closed outer wall made of steel and/or concrete.

5. Underwater pumped storage power plant according to claim 1, wherein the pumped storage power plant, in a pumped-out state during normal operation, has a mass that is at least not smaller than the mass of the water displaced by the pressure tank, so that the pumped storage power plant remains on the ocean floor even in what is, during normal operation, said pumped-out state, without anchoring.

6. Underwater pumped storage power plant according to claim 1, wherein the ballast material that fills the hollow spaces comprises natural bulk material whose mass can be increased on-site by adding water to said bulk material, so as to further increase the weight of the pressure tank.

7. Underwater pumped storage power plant according to claim 1, wherein the pressure tank has a pressure-resistant spherical or oval design.

8. Underwater pumped storage power plant according to claim 1, wherein the pressure tank is designed in the form of a torus made of a ring that is closed in itself and consists of pressure-resistant pipe sections.

9. Underwater pumped storage power plant according to claim 1, wherein the pressure tank is stabilized by means of an internal supporting structure comprising bars in order to increase its pressure resistance.

10. Underwater pumped storage power plant according to claim 1, wherein the pressure tank is filled with filling elements which provide the pressure tank with its pressure resistance while said pressure tank is in a pumped-out state, and which filling elements leave a storage volume for water in gaps between them.

11. Underwater pumped storage power plant according to claim 1, wherein the pump and the generator are designed as a common pump-turbine attached to a combined water inlet and outlet.

12. Power supply network comprising
a plurality of primary power stations, which generate electric energy that is fluctuating over time,
at least one underwater pumped storage power plant according to claim 1,
a plurality of consumption sites of electric energy,
an electric supply network which connects the consumption sites, the at least one underwater pumped storage power plant and the primary power stations so that the electric energy generated by the primary power stations, in times of excess electric energy by the primary power stations, can be temporarily stored reversibly by the at least one underwater pumped storage power plant and in times of increased power demand said electric energy can be recovered and the recovered electric energy can be directed to the consumption sites.

13. Method for temporary reversible intermediate storage of electric energy from primary power stations, having an underwater pumped storage power plant with an artificial pressure tank that can be filled with water and that has been lowered from the surface of an ocean to the floor of said ocean, wherein the pressure tank has been designed in a pressure-resistant manner so that it can be pumped out while remaining dimensionally stable against the hydrostatic water pressure on the ocean floor, wherein the pressure tank comprises a water outlet which has a pump arranged at the pressure tank,
wherein for the purpose of storing the electric energy, water is pumped out of the pressure tank directly into the surrounding ocean against the hydrostatic pressure corresponding to the water depth, wherein electric energy is converted into potential energy corresponding to the water column at the water depth,
wherein for the purpose of recovering the electric energy, water directly from the surrounding ocean flows into the pressure tank with the hydrostatic water pressure corresponding to the water depth, and by means of a generator the potential energy corresponding to the hydrostatic water pressure of the water column in the water depth is converted into electric energy,
wherein, by means of power lines, for temporary reversible intermediate storage, electric energy is directed from the ocean surface down to the pressure tank and for consumption, electric energy is directed from the pressure tank back to the ocean surface,
the pressure tank comprising at least one of:
a water storage area for ballast water, which during normal operation is not used for storing energy, which water storage area is pumped out to reduce the mass of the pumped storage power plant to the extent that it can be brought from the ocean floor back to the ocean surface, or
hollow spaces for being filled with ballast material in order to increase the weight of the pressure tank
wherein the pumped storage power plant is initially balanced in such a way that its mass is smaller than the mass of the displaced ocean water so that the pumped storage power plant initially floats, and by filling bulk material and/or ballast water into the pressure tank at an intended site of sinking, the mass of the pumped storage power plant is increased to the extent that the mass of the pumped storage power plant becomes greater than the mass of the displaced water, resulting in the fact that the pumped storage power plant sinks down and comes to rest on the ocean floor.

14. Underwater pumped storage power plant for a temporary reversible intermediate storage of electric energy from other power stations, comprising a pressure tank that can be filled with water and that can be lowered from the surface of an ocean to the floor of said ocean, wherein said pressure tank has a pressure-resistant design so that said pressure tank can be emptied while remaining dimensionally stable against the hydrostatic pressure on the ocean floor,
wherein the pressure tank comprises a water outlet which has a pump arranged at the pressure tank for pumping water out of the pressure tank and into the surrounding ocean against the hydrostatic water pressure corresponding to the water depth, wherein the pump converts electric energy into potential energy corresponding to a water column displaced by pumping water out of the pressure tank into the surrounding ocean against the hydrostatic water pressure of the surrounding ocean, wherein the pressure tank includes a valve at the outlet to close the outlet when no energy is being stored or recovered,
wherein the pressure tank comprises a water inlet which has a generator arranged at the pressure tank for allowing water to flow directly from the surrounding ocean into the pressure tank with the hydrostatic water pressure corresponding to the water depth, wherein the generator converts the potential energy of the previously displaced water column back into electric energy when the water flows in with the hydrostatic water pressure at the water depth of the surrounding ocean, wherein said underwater storage power plant comprises power lines for transporting the electric energy from the ocean surface to the pressure tank and back, wherein the pressure tank is closed except for the water inlet and water outlet such that water is pumped out of the pressure tank without use of at least one of:
1) pipes for transporting water between the pressure tank and the ocean, or
2) air ducts between the pressure tank and the ocean surface; and the pressure tank comprising at least one of:
   a water storage area for ballast water, which during normal operation is not used for storing energy, which water storage area is pumped out to reduce the mass of the pumped storage power plant to the extent that it can be brought from the ocean floor back to the ocean surface, or hollow spaces for being filled with ballast material in order to increase the weight of the pressure tank, wherein the pumped storage power plant is initially balanced in such a way that its mass is smaller than the mass of the displaced ocean water so that the pumped storage power plant initially floats, and by filling bulk material and/or ballast water into the pressure tank at an intended site of sinking, the mass of the pumped storage power plant is increased to the extent that the mass of the pumped storage power plant becomes greater than the mass of the displaced water, resulting in the fact that the pumped storage power plant sinks down and comes to rest on the ocean floor.

\* \* \* \* \*